United States Patent [19]
DeLoach

[11] 3,866,951
[45] Feb. 18, 1975

[54] COMBINATION SKID AND COUPLING ASSEMBLY

[76] Inventor: Wells D. DeLoach, 3353 Rio Bonito, Covina, Calif. 91722

[22] Filed: Sept. 17, 1973

[21] Appl. No.: 397,705

[52] U.S. Cl. .................................. 285/5, 285/111
[51] Int. Cl. ...................... B05b 15/00, F16l 21/02
[58] Field of Search .............. 285/5, 6, 24, 27, 111; 239/213; 137/344

[56] References Cited
UNITED STATES PATENTS

| | | | |
|---|---|---|---|
| 2,469,538 | 5/1949 | Young | 285/5 |
| 3,366,403 | 1/1968 | Nelson | 285/6 |
| 3,386,755 | 6/1968 | Miller | 285/6 |
| 3,485,515 | 12/1969 | Frishof | 285/5 |
| 3,539,206 | 11/1970 | Gheen et al. | 285/5 |
| 3,545,478 | 12/1970 | Etgen | 285/5 X |
| 3,642,306 | 2/1972 | Gheen et al. | 285/5 |
| 3,664,688 | 5/1972 | DeLoach | 285/6 |

Primary Examiner—Thomas F. Callaghan
Attorney, Agent, or Firm—Boniard I. Brown

[57] ABSTRACT

A combination skid and coupling assembly for releasibly joining adjacent pipe sections of an irrigation drag line in a manner which permits towing of a relatively long drag line with a length on the order of a quarter mile from one location to another without parting of the drag line couplings. The skid/coupling assembly has two mating parts, herein referred to as a coupling head and a coupling yoke, to be firmly joined, preferably by welding to the ends of two pipe sections. The coupling head has a one piece cast construction including a tubular body providing at one end a nipple to be permanently joined to one pipe section and at the other end a socket bounded by a resilient seal ring for removably receiving the second pipe section, a cradle for the latter pipe section formed with thrust shoulders facing the socket, and a curved ground skid. The coupling yoke has a curved band for partially surrounding the second pipe section and thrust lugs at the ends of the band for engaging the coupling heat thrust shoulder to prevent separation of the coupling parts and their pipe sections when the drag line is towed.

2 Claims, 7 Drawing Figures

PATENTED FEB 18 1975 3,866,951
SHEET 2 OF 2

COMBINATION SKID AND COUPLING ASSEMBLY

BACKGROUND OF THE INVENTION

1. Field of the Invention

This invention relates generally to field irrigation equipment and more particularly to a novel combination skid and coupling assembly for an irrigation drag line.

2. Prior Art

As is well known to those versed in the field irrigation art, an irrigation drag line is essentially a string of water pipes arranged end to end and releasibly joined by intervening couplings. Each coupling has a riser for connection to an irrigation head. In use, one end of the drag line is connected to a source of water under pressure. The motor discharges from the irrigation heads on the couplings to irrigate the ground at either side of the drag line.

An irrigation drag line of this kind is moved from one location to another by towing or dragging the line behind a tractor. In order to facilitate this dragging movement, the drag line is provided with ground skids which extend beneath the couplings and slide along the ground when the line is towed. The two parts of each coupling are provided with anti-separation means, such as interlocking to prevent parting of the couplings under the force of the towing load exerted on the couplings.

The prior art is replete with a wide assortment of drag line couplings. Examples of such couplings are described in the following U.S. Pat. Nos. 1,487,517; 2,067,428; 2,221,284; 2,670,222; 2,803,498; 3,342,504; 3,366,403; 3,545,478; and 3,664,688.

The prior art drag line couplings have certain disadvantages which this invention overcomes. One of these disadvantages resides in the fact that the coupling skid is often formed separately from the other coupling parts and separately attached in some fashion to the drag line. While some couplings, such as that described in U.S. Pat. No. 3,366,403, have a ground engaging portion or "shoe" formed integrally with the coupling part, this shoe is designed to function more as a support for positioning the irrigation head of the coupling in its normal upright position during irrigating operation of the drag line than a ground skid for facilitating sliding movement of the drag line across the ground.

Another disadvantage of many couplings is that their coupling parts are clamped to the drag line pipe sections. The pipe clamps of these couplings tend to slip on the drag line pipe sections when towing the drag line to a new location. As a consequence, if the drag line is very long, it is often necessary to at least partially disassemble the line and tow the latter in sections, which must then be recoupled at the new location, in order to prevent parting of the line by slipping of the couplings from the pipe sections.

SUMMARY OF THE INVENTION

This invention provides a new and improved drag line coupling which avoids the above and other disadvantages of the existing drag line couplings. The coupling has two mating coupling parts which are joined, preferably by welding, to the ends of two drag line pipe sections. One coupling part is a coupling head having a tubular body providing at one end a nipple to be permanently joined to one pipe section and at the other end a socket surrounded by a resilient seal ring for removably receiving the second pipe section. Extending from the body, beyond the socket end, is a cradle which receives or cradles the second pipe when inserted in the socket. This cradle is formed with thrust shoulders facing the body. Joined to the under side of the coupling head body and cradle is a ground skid with upwardly curving front and rear ends.

The coupling yoke has a curved band adapted to fit about and to be welded to one half of the second drag line pipe section. Cast integrally with this band and projecting outwardly from its ends in a common plane are a pair of thrust lugs. When the coupling parts are assembled to join their pipe sections end to end, the yoke lugs engage the coupling head thrust shoulders to prevent axial separation or parting of coupling parts and hence their pipe sections.

According to a feature of the invention, the thrust shoulders on the coupling head and lugs on the coupling yoke are shaped to facilitate engagement of the coupling parts. Separation of the parts is also easily accomplished.

DESCRIPTION OF THE PREFERRED EMBODIMENT

Figure 7:
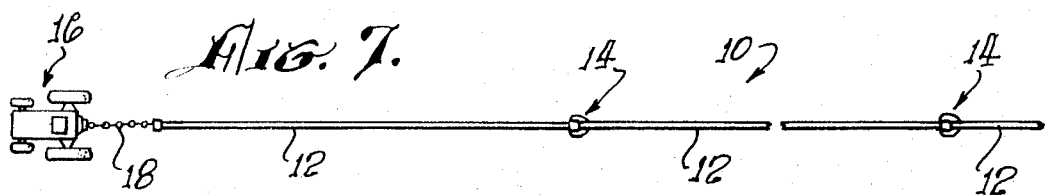
FIG. 7 illustrates an irrigation drag line being towed.

Referring first to FIG. 7, there is illustrated an irrigation drag line 10 comprising a number of pipe sections 12 joined end to end by combination skid/coupling assemblies 14 according to the invention. As noted earlier, the drag line may be a quarter mile or more in length. Each coupling mounts an irrigation head (not shown), such as a rotary pulsating sprinkler head, for irrigating or watering the ground at either side of the drag line when the latter is in operation.

Rather than having a separate drag line for each portion of a large field, it is common practice to periodically move a single drag line from one part of the field to another. As mentioned earlier, this is accomplished by dragging or towing the drag line, often in separate sections, with a tractor. FIG. 7 shows a tractor 16 attached by a chain 18 to one end of the drag line 10 for towing the latter across a field. As mentioned earlier and as will become evident from the ensuing description, one advantage of the present skid/coupling assembly resides in the fact that it is designed to enable towing of a long drag line across a field without parting of the line, thus minimizing the time and labor involved in moving the line from one location to another.

Turning now to FIGS. 1-6, each drag line skid/coupling assembly 14 comprises two mating coupling parts 20 and 22. Coupling part 20 is referred to herein as a coupling head and part 22 as a coupling yoke. Each part comprises a one piece casting of any suitable metal, such as aluminum.

Coupling head 20 has a generally tubular body 24 with a slightly reduced end forming a coupling nipple 26 for connection to one end of a drag line pipe section 12. According to a preferred practice of the invention, the nipple 26 is permanently welded to the pipe section 12. To this end, the nipple is internally counter-bored to form a seat 28 for receiving the pipe section with a snug fit. After insertion of the pipe section into the seat, the nipple is welded to the pipe section, as shown at 30.

The opposite end of the coupling head body 24 forms a socket 32 for receiving one end of a second drag line pipe section 12. The internal diameter of this socket is slightly larger than the outside of the second pipe section, such that the latter section may be tilted relative to the coupling body 14, as indicated by the solid and broken lines in FIG. 4. Socket 32 internally grooved to form a seat 34 for a resilient seal ring 36. The internal diameter of this seal ring is slightly smaller than the outside diameter of the second pipe section 12 so that when the pipe section is inserted through the ring, the latter forms a water tight seal between the pipe section and the coupling head body 24. Being resilient, the seal ring permits tilting of the pipe section between its solid and broken lines in FIG. 4.

Figure 4:
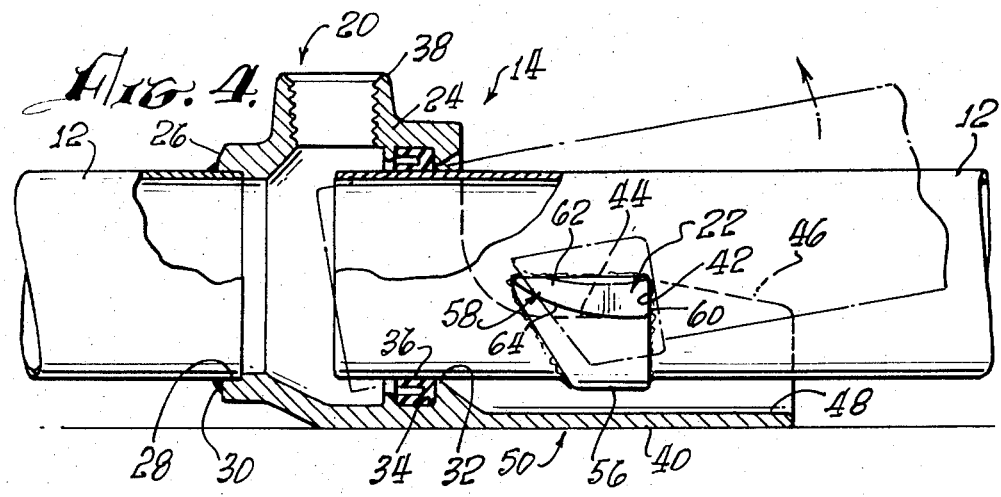
FIG. 4 is a section taken on line 4—4 in FIG. 2.
Figure 5:
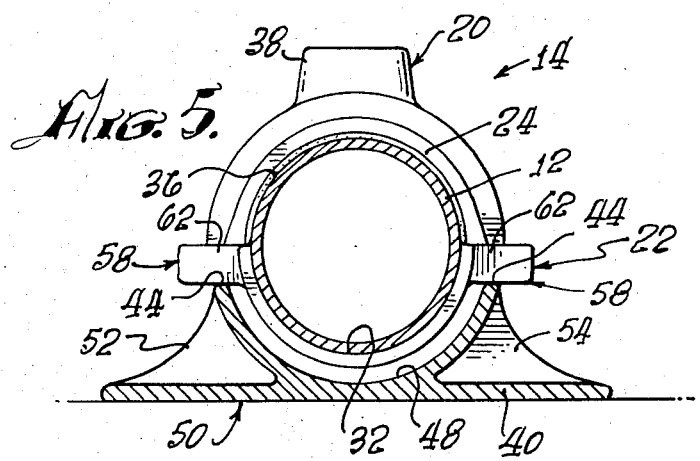
FIG. 5 is a section taken on line 5—5 in FIG. 3.

Formed on the normally upper side of the coupling head body 24 is a nipple or riser 38. This riser is internally threaded to receive an irrigation head (not shown) of the kind mentioned earlier. As shown in FIG. 4, a gap or space exists between the adjacent ends of the drag line pipe sections 12 joined by the skid/coupling assembly 14 so that water may flow from the drag line to the irrigation head.

Extending from the normally lower side of the coupling head body 24, generally parallel to its central axis and beyond its coupling socket 32, is a cradle 40 for the second drag line pipe section 12 which engages in the socket. This cradle is generally semi-cylindrical in form and has an internal radius somewhat greater than the radius of the pipe section. The cradle provides an upwardly trough to recline or cradle the second pipe section 12 in the manner shown best in FIG. 1.

Figure 1:
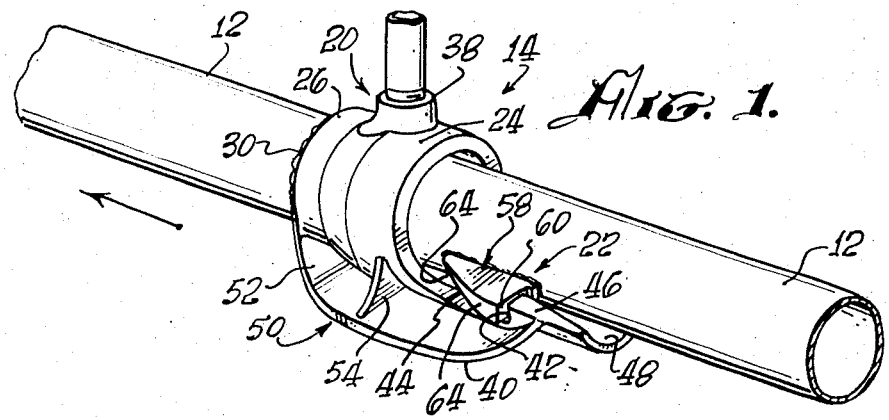
FIG. 1 is a perspective view of a skid/coupling assembly according to the invention installed in an irrigation drag line.
Figure 2:
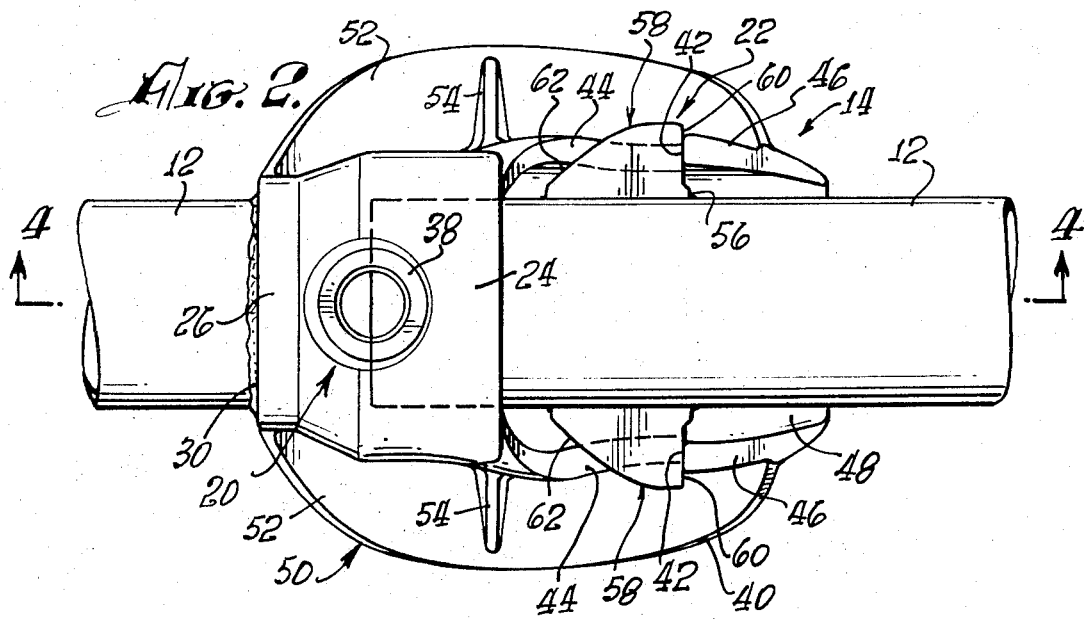
FIG. 2 is an enlarged top view of the assembly in FIG. 1.
Figure 3:
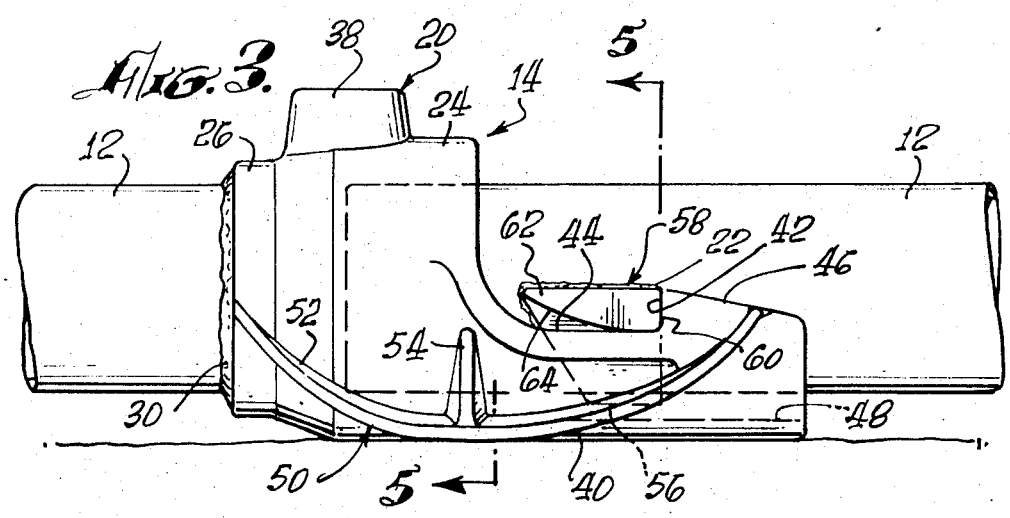
FIG. 3 is a side elevation of the assembly.

Referring particularly to FIGS. 1–3, it will be seen that upper edges of the cradle wall are stepped to provide on the cradle thrust shoulders 42 spaced from and facing the coupling head body 24 and upwardly opening recesses 44 between the body and shoulders. The thrust shoulders are disposed in a common plane normal to the axis of the body. Between the thrust shoulders and the outer or right hand end of the cradle 40, the upper cradle edges are inclined to form camming edges 46. Also, as shown best in FIG. 1, the inner surface portion 48 of the cradle between the thrust shoulders and the right hand cradle end flares outwardly at a slight angle.

At the bottom of the coupling head 20 is a ground skid 50. This ground skid extends substantially the full length of the coupling head, from its coupling nipple 26 to the outer end of its cradle 40. The skid has arcuate wing-like portions or extensions 52 which project beyond opposite sides of the coupling head and have a generally semi-cylindrical form, as viewed edgewise in FIG. 3. Gussets 54 extend between the coupling head body 24 and the skid extensions 52 to reinforce the latter.

As noted earlier, and as shown in the drawings, the entire coupling head 14 described above is cast in one integral piece.

Figure 6:
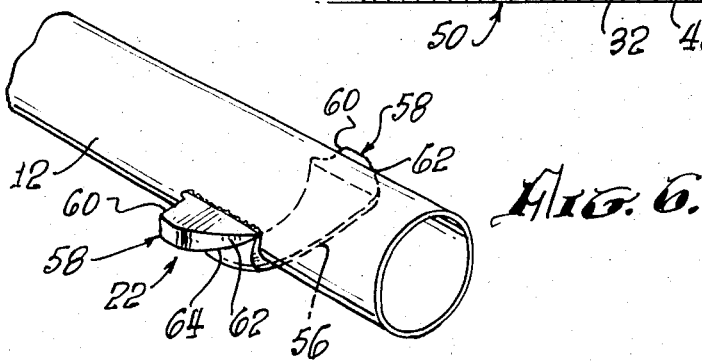
FIG. 6 is a perspective view of a pipe section mounting the coupling yoke.

Turning to FIG. 6, the coupling yoke 22 has a semicircular band 56 which fits about the lower side of and has the same curvature as its pipe section 12. The outer radius of the band approximates the inner radius of the coupling head cradle 40. The yoke is rigidly joined to the pipe section, preferably by welding the yoke band to the pipe section, as shown. Projecting outwardly from the ends of the yoke band 56, in a common plane containing the axis of the pipe section, are coupling lugs 58. These coupling lugs have thrust shoulders 60 facing the distal end of the pipe section and disposed in a common plane normal to the axis of the section, and tapered camming edges 62 which curve inwardly toward the pipe section. As shown in FIG. 3, the under surfaces 64 of the lugs curve upwardly from the thrust shoulders 60 to the lug edges 62. The coupling yoke, like the coupling head, is cast in one integral piece.

The pipe sections 12 are joined by the skid/coupling assembly 14 by resting the coupling head 20 on the ground and moving the opposite pipe section 12 axially toward the coupling head in such a way that the coupling lugs 58 on the coupling yoke 22 ride up along the camming edges 46 on the coupling head cradle 40. It will be recognized that the taper of the latter edges, the flare of the cradle surface 48, and the tapered configuration of the lugs 58 aid in guiding the pipe section into the coupling head. Upon engagement of the lugs 58 with the cradle edges 46, the pipe section is tilted upwardly to its broken line position of FIG. 1, after which the leading end of the pipe section is inserted into the coupling head socket 32 until the lugs clear the coupling head thrust shoulders 42. The pipe section is then dropped to its solid line position of FIG. 1, wherein the coupling lug thrust shoulders 60 engage the coupling head thrust shoulders 42 and the yoke band 56 rests on the coupling head cradle 40 to securely interlock the coupling parts 20, 22 and hence their pipe sections 12 against separation to permit dragging of the drag line 10 across a field, as explained earlier. During this dragging motion, the integral ground skid 50 of each coupling slides across the ground to minimize the dragging friction on the drag line. The drag line pipe sections are uncoupled by reversing the coupling procedure described above.

The inventor claims:

1. A combination skid and coupling assembly for joining adjacent pipe sections of an irrigation drag line comprising:

a pair of mating coupling parts including a coupling head and a coupling yoke each comprising an integral one-piece structure, said coupling head including a tubular coupling body having a coupling nipple at one end for attachment to one pipe section and a coupling socket at the other end for removably receiving one end of the other pipe section, a generally semi-cylindrical cradle extending axially from the bottom of and beyond the latter end of said coupling head, and providing an upwardly opening trough for cradling said other pipe section, and a ground skid at the bottom of said coupling head having arcuate lateral extensions projecting beyond opposite sides of said body and cradle and curving upwardly toward each end of said coupling head, the upper edges of said cradle being stepped to provide thrust shoulders spaced from and facing said coupling head and upwardly opening recesses between said head and thrust shoulders, said coupling yoke including an arcuate band to fit about and be secured to said other pipe section, and coupling lugs projecting radially outward from the ends of said band, said coupling parts being adapted to be assembled in coupled relation, wherein said lugs are disposed in said cradle edge recesses with the normally lower surfaces of the lugs facing the cradle edges and one end of the lugs engaging said cradle thrust shoulders to interlock said parts against axial separation, and the cradle edge portions in the regions between said thrust shoulders and the outer cradle end sloping downwardly toward said cradle end and said lower coupling lug surfaces sloping upwardly toward the opposite ends of the lugs and the radially outer edges of the lugs converging in the direction of said latter lug ends to guide said coupling parts into assembled relation.

2. A combined skid and coupling assembly according to claim 1 wherein:

said skid extensions are generally cylindrically curved about a transverse axis of said coupling head.

* * * * *